(12) United States Patent
Chen et al.

(10) Patent No.: US 6,510,260 B2
(45) Date of Patent: Jan. 21, 2003

(54) N×N OPTICAL SWITCHING DEVICE BASED ON THERMAL OPTIC INDUCED INTERNAL REFLECTION EFFECT (75) Inventors: Ray T. Chen, Austin, TX (US); Ram Sivaraman, Austin, TX (US)

(73) Assignee: Finisar Corporation, Inc., Sunnyvale, CA (US)

( * ) Notice: Subject to any disclaimer, the term of this patent is extended or adjusted under 35 U.S.C. 154(b) by 0 days.

(21) Appl. No.: 09/999,054

(22) Filed: Nov. 1, 2001

(65) Prior Publication Data

US 2002/0085794 A1 Jul. 4, 2002

Related U.S. Application Data

(60) Provisional application No. 60/259,446, filed on Jan. 2, 2001.

(51) Int. Cl.[7] .................................................. G02B 6/26
(52) U.S. Cl. ............................. 385/17; 385/16; 385/18; 385/8
(58) Field of Search ................................ 385/16, 8, 17, 385/18, 19, 20, 14, 37, 40

(56) References Cited

U.S. PATENT DOCUMENTS

| | | |
|---|---|---|
| 4,614,408 A | 9/1986 | Mir et al. |
| 4,705,352 A | 11/1987 | Margolin et al. |
| 4,753,505 A | 6/1988 | Mikami et al. |
| 4,902,088 A | 2/1990 | Jain et al. |
| 5,009,483 A | 4/1991 | Rockwell, III |
| 5,291,567 A | 3/1994 | Revelli, Jr. et al. |
| 5,317,446 A | 5/1994 | Mir et al. |
| 5,513,285 A | 4/1996 | Kawashima et al. |
| 5,581,643 A | 12/1996 | Wu |
| 5,623,566 A | 4/1997 | Lee et al. |
| 5,653,008 A | 8/1997 | Sim et al. |
| 5,714,240 A | 2/1998 | Gupta et al. |
| 5,832,149 A | 11/1998 | Omizu et al. |
| 5,892,863 A | 4/1999 | Presby |
| 6,002,823 A | 12/1999 | Chandross et al. ........... 385/50 |
| 6,084,050 A | 7/2000 | Ooba et al. |
| 6,097,860 A | 8/2000 | Laor |
| 6,122,416 A | 9/2000 | Ooba et al. |
| 6,128,422 A | 10/2000 | Hodgson |
| 6,137,608 A | 10/2000 | White |
| 6,137,930 A | 10/2000 | Laughlin |

FOREIGN PATENT DOCUMENTS

| | | |
|---|---|---|
| DE | 3322508 | 1/1985 |
| DE | 0 367 682 | 5/1990 |

OTHER PUBLICATIONS

"Building Blocks for a 10x10 Crossbar Switch based on GaAs/GaAlAs Channel Waveguide Array" by Ray T. Chen, Microelectronics Research Center, Dept. of Electrical and Computer Engineering, Unversity of Texas, Austin, 1993.

"Polymeric Optical Waveguide Switch Using the Thermooptic Effect" by M.B.J. Diemeer, J.J. Brons, and E.S. Thrommel, Journal of Lightwave Technology, vol. 7, No. 3, pp. 449–453, Mar. 1939

WO 97/22907 dated Jun. 26, 199t entitled "Thermo–Optical Switch", p. 1.

Thylen, L., "Integrated Optics in LINBO3: Recent Developments in Devices for Telecom." pgs. 2,6,7,21,22,24–27, vol. 6, No. 6, Jun. 1 1988.

Primary Examiner—Phan T. H. Palmer
(74) Attorney, Agent, or Firm—Gray Cary Ware & Freidenrich (57) ABSTRACT

An optical switch which uses internal reflection at a junction formed by two waveguides is discussed. The waveguides may be formed from various materials such as polymers and other combinations of monomers. Substantially total internal reflection may be produced at the junction between the two waveguides in response to heating from a thin film electrode.

27 Claims, 5 Drawing Sheets

N×N OPTICAL SWITCHING DEVICE BASED ON THERMAL OPTIC INDUCED INTERNAL REFLECTION EFFECT

RELATED APPLICATION

This application is related to and claims the benefit of previously filed U.S. Provisional Patent Application Serial No. 60/259,446 filed Jan. 2, 2001 titled "NXN Optical Switching Device Based On Thermal Optic Induced Internal Reflection Effect."

TECHNICAL FIELD OF THE INVENTION

The present invention is related to switching light signals or optical signals using planar optical components and more particularly to equipment and methods which provide high speed switching of light signals in fiber optic networks and communication systems by inducing internal reflection at a junction between two waveguides.

BACKGROUND OF THE INVENTION

The increased demand for data communication and the remarkable growth of the internet have resulted in increased demand for communication capability within metropolitan areas. There has also been an equally large increase in demand for communication capability between large metropolitan areas. Optical communication systems using a network of fiber optic cables are being developed and installed to meet this increased demand.

Various types of optical switches and techniques are currently used in communication systems and computer systems. Many currently available optical switches are based upon optoelectric and electrooptic conversion of light signals and electrical signals within the associated optical switch. One type of presently available optical switch includes a matrix of thermooptic switching elements interconnected by waveguides formed on a silica substrate. Switching of light signals is accomplished by the use of thin film heaters to vary the temperature of the switching elements. Electrical circuits are also provided to supply switching current to the heaters. A heat sink may be provided to dissipate heat caused by the switching operations. One example of such switches is shown in U.S. Pat. No. 5,653,008.

Various types of planar optical switches are currently available for some applications. Such planar switches are often fabricated by Ti-difusion in LiNbO$_3$. Switched directional couplers represent one example of LiNbO$_3$ based switches which are commercially available. This type of planar switch functions very rapidly in the sub-nanosecond range. However, LiNbO$_3$ based switches are generally polarization sensitive and relatively expensive.

For some switching applications, polarization insensitivity is more important than high speed switching of light signals flowing through a switch. Polarization insensitivity is particularly important for bypass switching in local area networks (LAN) and some wide area networks (WAN). Also, polarization insensitivity is a particularly desirable characteristic for circuit switching during distribution of video and graphic information. Optical waveguide switches using polarization independent thermal optic effects have been satisfactorily used when polarization insensitivity is required. However, such optical waveguide switches often have switching times in the range of milliseconds.

Some presently available optical switches include a semiconductor substrate with vertical current flow to heat active regions of an associated optical switch. One example of such switches is shown in U.S. Pat. No. 5,173,956. Some optical switches require mode perturbation to generate required mode patterns for the desired switching function. Examples of such optical switches include directional couplers and Mach Zhender interferometers. Such optical switch designs often have poor scalability, relatively high manufacturing costs and low optical signal bandwidth.

SUMMARY OF THE INVENTION

In accordance with teachings of the present invention, an optical switch is provided which substantially reduces or eliminates disadvantages and problems associated with presently available optical switches. The present invention provides an optical switch which uses internal reflection at a junction formed by two waveguides intersecting with each other at a selected angle. For some applications, substantially total internal reflection (TIR) will occur at the junction between the two waveguides in response to heating from a thin film electrode. For other applications, the desired internal reflection may be produced by electrooptic, magnetooptic or acoustooptic effects. The use of TIR in accordance with the teaching of the present invention may be used to provide a wide band optical switch which is not wavelength dependent.

An optical switch formed in accordance of teaching of the present invention provides a very high data-rate via an independent path for communicating optical signals between terminals once the optical switch has made the desired connection. Technical advantages of the present invention include a low cost, reliable optical switching device that may be integrated into a miniaturized version with system interchangeability in optical networking systems. An optical switch incorporating teachings of the present invention is intrinsically a wide band device covering all S-band, C-band and L-band optical signals.

The optical switch may be fabricated on a wide variety of materials such as polymer/SiO$_2$, polymer/polymer, polymer/polymer/polymer and semi-insulating/semiconductor substrates. The optical switch may be used in general purpose optical communication systems including fiber optic networks associated with modern metropolitan communication systems.

One aspect of the present invention includes a thermal optical switch having a two channel waveguide array with inputs and outputs well matched for use with single mode fibers. A junction formed by intersection of the waveguides with each other is relatively small to maintain substantially no cross talk between the respective waveguides while maintaining a relatively large dynamic range of low-cross talk and therefore, a small insertion loss. Beam propagation methods (BPM) may be used to determine characteristics of the junction such as dynamic range. An electrode may be placed on top of the intersection or junction of the waveguides along with both an electrical current input port and a grounding port located at the surface of the respective waveguides. Current may be introduced from the input port to flow through the electrode to the grounding port which creates sufficient heat to modulate the index of refraction within a portion of the waveguides disposed beneath the electrode. As a result of heat created by the electrode, the index of refraction will be reduced. The portion of the junction or intersection disposed underneath the electrode may encounter total internal reflection effect which provides desired switching of optical signals from one waveguide to the other waveguide. The location of the electrode may be selected in accordance with teachings of the present invention to maximize switching efficiency through temperature induced perturbation.

Two dimensional arrays formed in accordance with teachings of the present invention may be satisfactorily integrated to form a wide variety of arrays such as two by two, eight by eight, sixteen by sixteen and sixty-four by sixty-four. The resulting arrays may be hermetically sealed using appropriate semiconductor fabrication techniques. An optical switch formed in accordance with teachings of the present invention may be satisfactorily used in optical communication systems including fiber optic networks having cable lengths ranging from one hundred meters to thousands of kilometers.

Typical specifications for an optical switching device formed in accordance with teachings of the present invention include cross talk between adjacent waveguides of less than thirty (30) dB, insertion loss of less than five (5) dB per waveguide for an 8×8 switch, polarization independent return loss greater than forty (40) dB and a relatively fast switching time for a thermal optic device. For various applications the switching time may range from less than twenty milliseconds to much less than a millisecond.

Technical benefits of the present invention include providing an optical switch which does not require conversion between optical signals and electrical signals.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention and its advantages are best understood by referring to FIGS. 1 through 7 of the drawings, like numerals being used for like and corresponding parts of the various drawings.

The terms "optical signal or signals" and "lightwave signal or signals" are used in this application to include the full range of all electromagnetic radiation which may be satisfactorily used to communicate information through a waveguide and/or fiber optic cables. An optical switching device incorporating teachings of the present invention may be satisfactorily used to switch or direct signals in the infrared, visible and ultraviolet spectrum. The optical switching device may be used to communicate digital information and analog information.

The terms "polymer" and "polymers" are used in this application to include any macromolecule combinations formed by the chemical union of multiple, substantially identical combining units or monomers and have satisfactory characteristics for use as a waveguide for optical signals. Combinations of two, three or four monomers are often referred to respectively as dimers, trimers, and tetromers. These combinations may be further classified as inorganic, organic, natural, synthetic or semisynthetic. For purposes of this application, the terms "polymers and other combinations of monomers" and "polymers or other combinations of monomers" means any combination of two or more monomers which may be satisfactorily used to form a waveguide in accordance with teachings of the present invention including, but not limited to, inorganic, organic, natural, synthetic and semisynthetic combinations.

Figure 1:
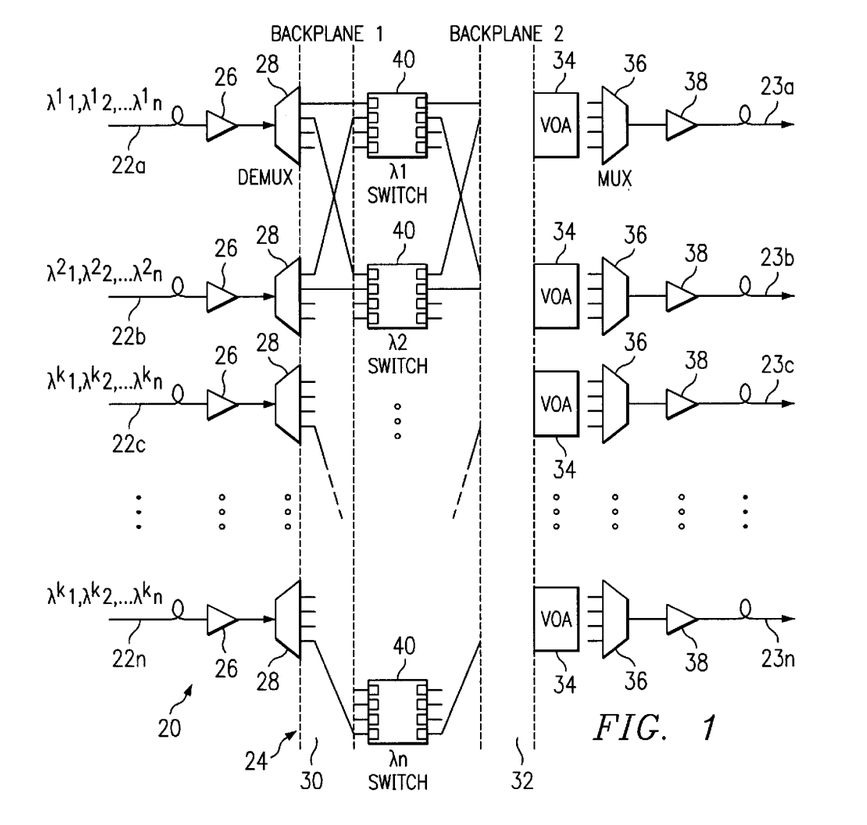
FIG. 1 is a schematic drawing showing various components associated with an optical communication system including a plurality of amplifiers and demultiplexers, a first backplane, a plurality of optical switches, a second backplane, a plurality of variable optical attenuators, multiplexers and amplifiers.

The portion of communication system or network 20 as shown in FIG. 1 includes a plurality of fiber optic cables 22 and 23. Wavelength division multiplexing (WDM) techniques may be used to allow each fiber optic cable 22 and 23 to carry multiple optical signals at various wavelengths which substantially increases the efficiency of each fiber optic cable 22 and 23. Recently, dense wavelength division multiplexing (DWDM) techniques have been developed to allow existing fiber optic networks to better satisfy the increased demand for communication capabilities.

Communication system 20 as shown in FIG. 1 preferably includes at least one switching center 24 having multiple optical switches 40 formed in accordance with teachings of the present invention. Optical switches 40 cooperate with each other to allow switching of a selected optical signal from one fiber optic cable 22 to a selected fiber optic cable 23. For purposes of describing various features of the present invention, switching center 24 will be described as having a plurality of input fiber optic cables 22 designated as 22a, 22b, 22c through 22n and a plurality of output fiber optic cables 23a designated as 23a, 23b, 23c through 23n. A large number of fiber optic cables may be satisfactorily coupled with optical switching center 24.

Various features of the present invention will be described with respect to switching an optical signal as it travels from an input fiber optic cable 22 to an output fiber optic cable 23 and from the input end of a waveguide to the output end of a waveguide. However, an optical switch formed in accordance with teachings of the present invention may be satisfactorily used to switch optical signals traveling in either direction through a fiber optic cable network or through associated waveguides. The optical signals may carry digital information or analog information.

Each fiber optic cable 22 may be coupled with switching center 24 through a respective amplifier 26 and dense wavelength division (DWD) demultiplexer 28. Backplane 30 is preferably provided for use in optically coupling each DWD demultiplexer 28 with optical switches 40. A second backplane 32 is preferably provided to couple the output from optical switches 40 with variable optical attenuators 34.

In a typical wavelength division multiplexing system, the power level of each signal transmitted from a respective input fiber optic cable 22 to a respective output fiber optic cable 23 may vary significantly. The power level for each signal communicated through second backplane 32 is preferably adjusted to avoid communication problems associated with multiple signals at different power levels. Thus, variable optical attenuators 34 are provided to adjust the power level of all signals exiting from backplane 32 to within a desired range. A plurality of DWD multiplexers 36 are respectively coupled with variable optical attenuators 34. The signals communicated from each DWD multiplexer 36 are preferably directed through a respective amplifier 38 and then to the associated fiber optic cable 23a through 23n.

Figure 2:
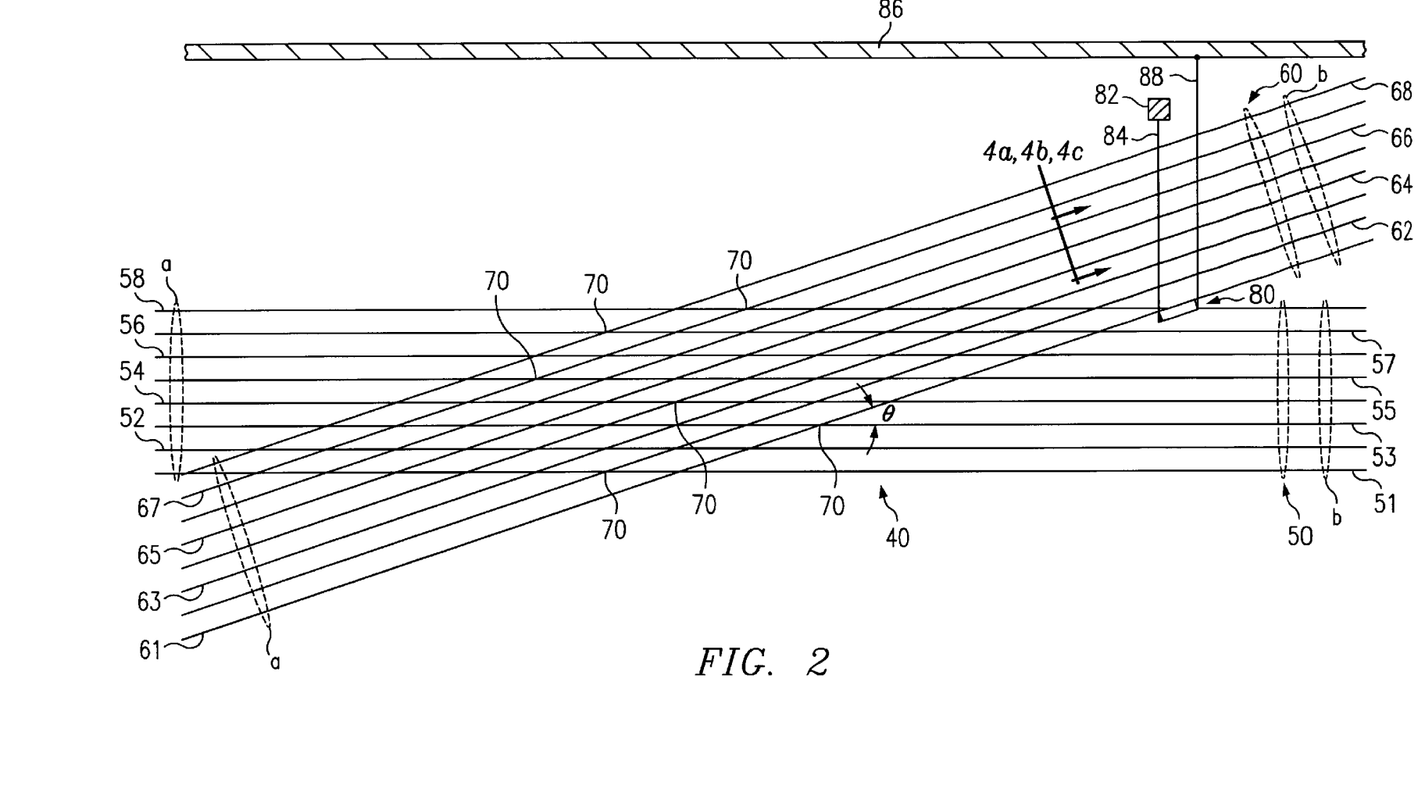
FIG. 2 is a schematic drawing showing a plan view with portions broken away of an 8×8 optical switch formed in accordance with teachings of the present invention.

FIG. 2 is a schematic drawing showing a plan view of one example of an optical switch 40 incorporating teachings of the present invention. For the embodiment as shown in FIG. 2 optical switch 40 preferably includes a first set or array of waveguides 50 and a second set or array of waveguides 60. For purposes of defining various features of the present invention the first array of waveguides 50 are numbered 51 through 58 and the second array 60 are numbered 61 through 68. Each set or array of waveguides 50 and 60 includes respective input ends "a" and output ends "b".

As previously noted, various features of switching center 24 and optical switches 40 will be described with respect to an optical signal traveling from input end "a" of a waveguide to output end "b" of a waveguide. However, an optical switching device formed in accordance with teachings of the present invention may be satisfactorily used to switch or redirect an optical signal traveling in either direction through a waveguide.

Optical switch 40 may be formed on a substrate using various types of semiconductor fabrication techniques. Waveguides 51 through 58 are preferably formed generally parallel with each other on substrate 42. Waveguides 61 through 68 are also formed generally parallel with each other on substrate 42. For some applications, first set of waveguides 50 and second set of waveguides 60 preferably intersect with each other at a selected angle θ. For some applications, waveguides 50 and 60 will preferably be formed on substrate 42 as shown in FIGS. 4, 5, 6 and 7. For some applications, a respective optical signal or lightwave signal (not expressly shown) will typically travel through respective waveguides 51–58 and 61–68 from the respective input end "a" to the respective output end "b".

The angle θ defined by the intersection between the waveguides of first array 50 and second array 60 is preferably selected to be between approximately two degrees (2°) and six degrees (6°) depending upon the microstructure of the material used to form the waveguides and the associated index of refraction. For one application angle θ is preferably approximately three degrees (3°). By forming optical switch 40 with an angle θ having a value between approximately two degrees to six degrees, an optical signal may travel through respective waveguides 51 through 58 and 61 through 68 without any significant perturbation or reflection at the intersection or junction of the waveguides unless the index of refraction at the junction is changed by heating. For other applications the index of refraction at the junction may be change by electrooptic, magnetooptic or acoustooptic effects.

A respective electrode heater 80 is preferably disposed adjacent to each intersection 70 of the first array of waveguides 50 with the second array of waveguides 60. Electrode heater 80 may be formed from various types of materials including nickel chrome alloys (NiCr) and chromium gold (Cr/Au). For purpose of illustration only one electrode heater 80 is shown in FIG. 2. Since first array 50 and second array 60 each have eight individual waveguides, optical switch 40 has a total of sixty-four (64) intersections or junctions 70 between waveguides 51–58 and waveguides 61–68. Therefore, optical switch 40 will preferably have sixty-four (64) electrode heaters 80. As discussed later in more detail, each electrode heater 80 may apply heat to its associated junction 70 to direct or deflect optical signals from an associated waveguide in first array 50 to an associated waveguide in second record 60 or from an associated waveguide in second array 60 to an associated waveguide in first array 50.

An optical signal travelling from respective input end "a" of waveguides 51 through 58 or respective input end "a" waveguides 61 through 68 may be switched to a selected waveguide in the other waveguide array using appropriate electrode heater or heaters 80. Electrical current may be provided from an appropriate source such as current source 82 formed on substrate 42. For the embodiment of the present invention as shown in FIG. 2 current may flow from source 82 through lead 84, electrode 80 and return to ground 86 through lead 88. Current source 82, leads 84 and 88, and ground 86 may be formed on substrate 42 using conventional semiconductor fabrication techniques.

Figure 3:
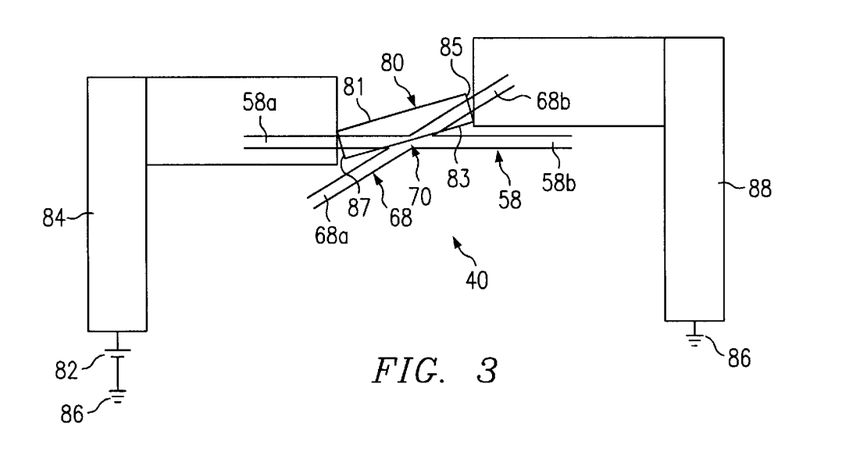
FIG. 3 is a schematic drawing showing a plan view with portions broken away of two waveguides of an optical switch such as shown in FIG. 2.
Figure 5:
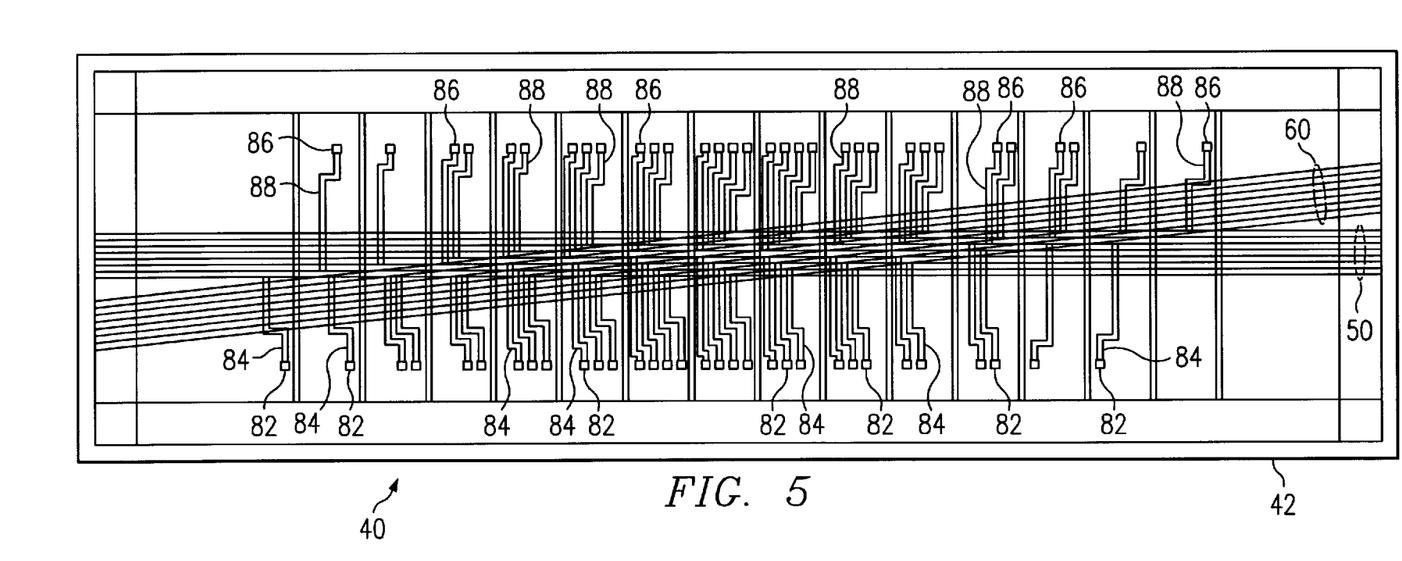
FIG. 5 is a schematic drawing showing an enlarged plan view with portions broken away of an 8×8 optical switches formed in accordance with teachings of the present invention.

FIG. 3 is a schematic drawing showing an enlarged view of intersection 70 between waveguide 58 and waveguide 68. One example of low resistance electrical leads 84 and 88 are shown in more detail. Other type of low resistance electrical leads 84 and 88 such as shown in FIG. 5 may also be used. For the embodiment of the present invention as shown in FIG. 3, electrode heater 80 has a generally rectangular configuration defined in part by a pair of longitudinal edges 81 and 83 and lateral edges 85 and 87. For the embodiment of the present invention as shown in FIG. 3, longitudinal edges 81 and 83 may have a length of approximately two hundred fifty micrometers (250 μm) and lateral edges 85 and 87 preferably have a length of approximately ten micrometers (10 μm). The thickness of electrode 80 is preferably very small, almost zero, as compared with the thickness of associated waveguides 58 and 68.

Electrode heater 80 is preferably disposed over one half of intersection 70 between waveguide 58 and waveguide 68. A layer of cladding is preferably disposed between each waveguide 51–58 and 61–68 and between each electrode heater 80 and the corresponding junction or intersection 70. For the embodiment of the present invention as shown in FIG. 3, longitudinal edge 83 of electrode heater 80 is preferably disposed on a line which corresponds generally with the longitudinal centerline of junction 70 between waveguide 58 and waveguide 68.

For some applications, the vertical spacing or distance between electrode heater 80 and the corresponding junction 70 is approximately five micrometers (5 μm) within a range of plus or minus 0.5 μm. Also, the lateral offset between longitude edge 83 of each electrode 80 and the corresponding longitudinal centerline of the respective intersection 70 is preferably less than 9.5 μm. When the offset between electrode heater 80 and the respective intersection 70 exceeds these limits, the desired heating of intersection 70 and resulting internal reflection of an optical signal traveling therethrough may not occur.

When electrical current is provided to electrode heater 80, heating will occur in the cladding material disposed beneath electrode 80 and the corresponding portion of the intersection 70. The configuration and location of electrode 80 allows heating of selected portions of waveguides 58 and 68 to change the corresponding refractive index which forms what could be considered as a imaginary mirror at the longitudinal centerline of intersection 70. The refractive index remains substantially unchanged in portions of intersection 70 which are not disposed under electrode 80. Heating of both the cladding material and portions of the associated waveguides at each intersection 70 changes the refractive index such that total internal reflection may occur. In effect, the heating caused by electrode 80 produces an imaginary mirror at junction 70 which will reflect or deflect light from waveguide 58 to travel through waveguide 68. The same mirror affect will cause optical signals traveling through waveguide 68 to be reflected or deflected into waveguide 58.

Figure 4A:
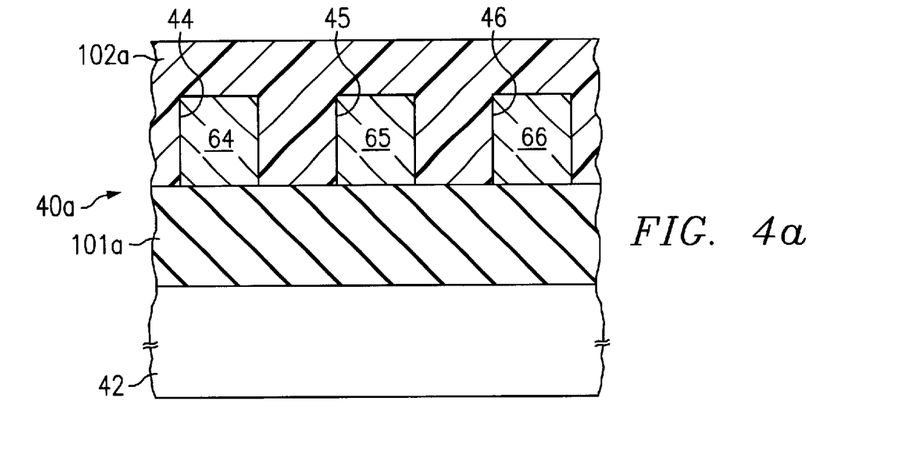
FIG. 4a is a schematic drawing in section with portions broken away taken along lines 4—4 of FIG. 2 showing one example of an optical switch formed on a substrate in accordance with the teachings of the present invention.
Figure 4B:
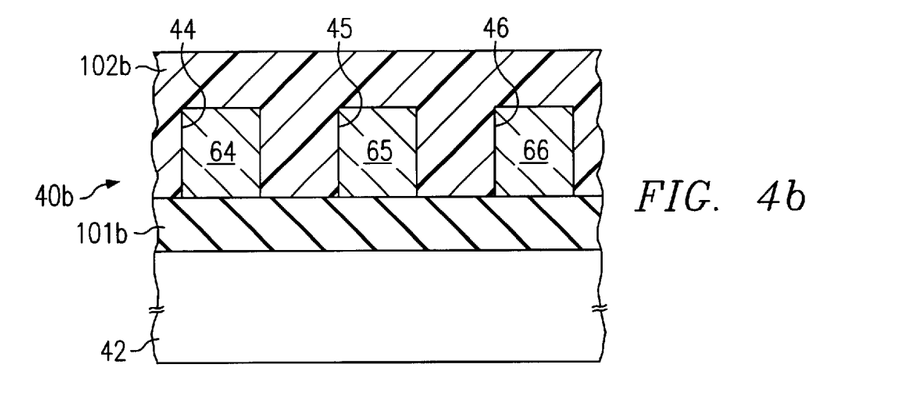
FIG. 4b is a schematic drawing in section with portions broken away taken along lines 4—4 of FIG. 2 showing another example of an optical switch formed on a substrate in accordance with the teachings of the present invention.
Figure 4C:
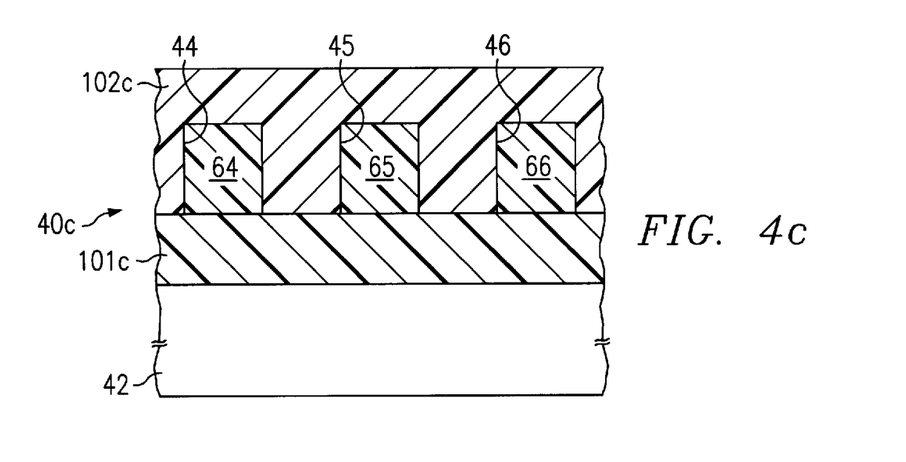
FIG. 4c is a schematic drawing in section with portions broken away taken along lines 4—4 of FIG. 2 showing still another example of an optical switch formed on a substrate in accordance with teachings of the present invention.

FIGS. 4a, 4b, and 4c show various examples of waveguides which may be formed on a substrate using semiconductor fabrication techniques to produce an optical switching device incorporating teachings of the present invention. For the embodiments shown in FIGS. 4a, 4b, and 4c, substrate 42 may be part of a typical silicon wafer used in semiconductor fabrication. However, an optical switching device may be formed in accordance with teachings of the present invention on a wide variety of substrates and is not limited to use with only conventional silicon substrates.

Waveguides 51–58 and 61–68 of optical switch 40 are preferably disposed in respective channels formed in a layer of top cladding. Waveguides 51–58 and 61–68 may be formed from a wide variety of materials including polymers, polyimide, amorphous fluoropolymers such as Teflon® AF, a mixture of silicon dioxide and polymeric materials, ion exchange and polymer and fluorinated polyimide, perfluorocyclobutane (PFCB), bisbenzocyclobutene (CBC) and fluorinated cyclobutane compounds. Many of these materials are available from Dow Chemical Company. For some applications a benzocyclobutene based polymer dielectrics such as CYCLOTENE™ Resins from The Dow Chemical Company may be used. CYCLOTENE™ Resins are high-purity polymer solutions that have been developed for microelectronics applications. The resins are derived from B-staged bisbenzocyclobutene (BCB) monomers and are formulated as high-solids, low-viscosity solutions.

Teflon is a registered trademark of E. I. duPont de Nemours and Company. Teflon AF, Teflon AF 1600, Teflon AF 2200 and Teflon AF 2400 are available from DuPont and other companies. For example, the top layer may be formed from Ultradel U 9120 polyimide having a refraction index of 1.5397 and a core of Ultradel U 9020 polyimide having a refraction index of 1.526. Ultradel is a trade name associated with polyimide materials available from BP Amoco.

For some applications, the spacing between these channels may be approximately eighty micrometers (80 μm). The portions of the embodiments of the present invention shown in FIGS. 4a, 4b, and 4c include three channels designated 44, 45 and 46. Each channel 44, 45 and 46 preferably has a generally rectangular cross section with dimensions in the range of approximately six or seven micrometers (6 or 7 μm). Various features of the present invention will be described with respect to optical switch 40a, 40b and 40c as shown respectively in FIGS. 4a, 4b and 4c.

Switch 40a as shown in FIG. 4a preferably includes a layer 101a of silicon dioxide ($SiO_2$) disposed immediately adjacent to substrate 42. For some applications, layer 101a may have a thickness of approximately fifteen micrometers (15 μm) with an index of refraction of approximately 1.445. Waveguides 64, 65 and 66 may be formed on layer 101a from a combination of silicon dioxide and gallium oxide ($SiO_2$:$GaO_2$) with an index of refraction of approximately 1.4538. Second layer 102a is preferably formed on first layer 101a and waveguides 64, 65 and 66 to provide channels 44, 45 and 46. Layer 102a may also be referred to as "top cladding". Respective waveguides 64, 65 and 66 are thus disposed in respective channels 44, 45 and 46. For the embodiment of the present invention as shown in FIG. 4a, layer 102a may be formed from Teflon AF 1600 having an index of refraction of approximately 1.31. The thermal optic coefficient of many polymers is generally less than zero. As a result, when the temperature of such polymers is increased, the corresponding index of refraction is reduced. Teflon AF 1600 represents one example of a polymer having the desired thermal optic coefficient.

Optical switch 40b as shown in FIG. 4b preferably includes first layer 101b formed from silicon dioxide having a thickness of approximately 2.4 micrometers (2.4 μm). Second layer or top cladding 102b may be formed from polymeric material such as Ultradel 9021 having an index of refraction of approximately 1.526. For the embodiment of the present invention as represented by optical switch 40b, waveguides 64, 65 and 66 may be formed from Ultradel 9120 having an index of refraction of approximately 1.5397.

Optical switch 40c as shown in FIG. 4c preferably includes first layer 101c formed from Teflon AF 240 having an index of refraction of approximately 1.29. Second layer or top cladding 102c may be formed from Teflon AF 240 having an index of refraction of 1.29. The thickness of first layer 101c may be approximately five micrometers (5 μm). Waveguides 64, 65 and 66 may be formed from Teflon AF 160 having an index of refraction of approximately 1.31.

A wide variety of polymers and other combinations of monomers may be satisfactorily used to form waveguides and optical switches in accordance with teachings of the present invention. The previous discussion of some examples of chemical compounds is illustrative only and is not intended to limit the scope of the present invention.

Figure 6:
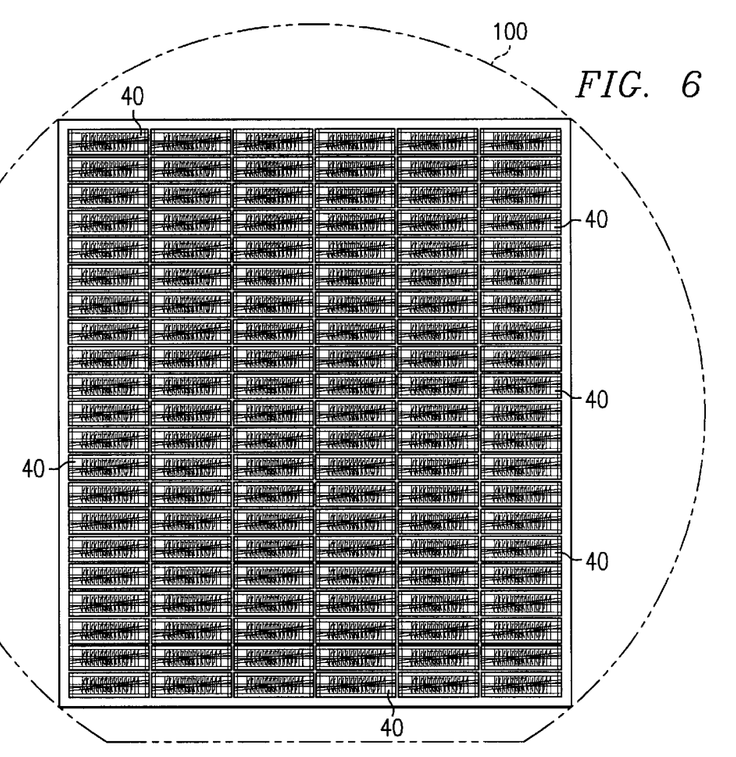
FIG. 6 is a schematic drawing with portions broken away showing a plan view of multiple 8×8 optical switches formed in accordance with teachings of the present invention on a semiconductor substrate.

FIG. 5 is a schematic drawing showing an example of optical switch 40 formed on a die or chip cut from a silicon wafer. FIG. 6 is a schematic drawing showing one hundred twenty six (126) optical switches 40 incorporating teachings of the present invention disposed on a typical semiconductor wafer 100.

Figure 7:
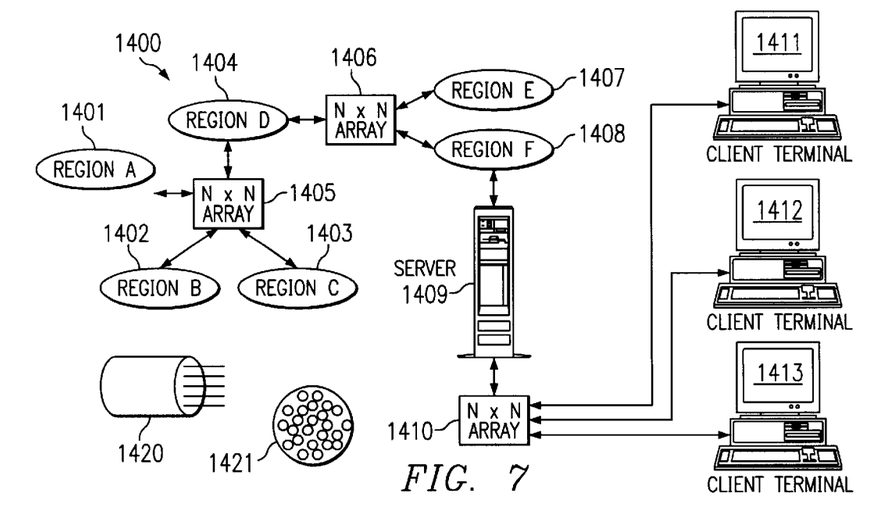
FIG. 7 illustrates one example of an optical communication system incorporating an N×N switching array formed in accordance with the teachings of the present invention.

FIG. 7 illustrates an optical communication system incorporating an N×N switching array formed in accordance with the teachings of the present invention. The system, illustrated generally at 1400, includes a plurality of regions operable to communicate information via a fiber optic network. Network 1400 includes a region A 1401, region B 1402, region C 1403, and region D 1404 optically coupled to an N×N array 1405. Region D is further coupled to region E 1407, and region F 1408 via N×N array 1406. Server 1409 is coupled to region F 1408 and N×N array 1410. N×N array 1410 is also coupled to first client terminal 1411, second client terminal 1412, and third client terminal 1413.

Communication between the regions, arrays, servers, client terminals, etc. may be provided through use of fiber optic cables. A general illustration of a fiber optic cable having a plurality of fiber optic waveguides illustrated at 1420 and 1421.

Fiber optic cable 1420 having a plurality of fiber optic waveguides 1421 may be coupled between regions via an N×N array. For example, region A 1401 may be coupled to N×N array 1405 via a fiber optic cable having 10,000 channels or fiber optic waveguides. Additionally, region 1404 may be coupled to N×N array 1405 via a fiber optic cable having 1,000 channels or fiber optic waveguides. As such, an optical signal may be communicated or switched by N×N array 1405 to a desirable channel or fiber optic waveguide.

Network 1400 advantageously provides for high capacity fiber optic utilization operable to communicate optical signals at high transmission capacities. In one embodiment, communication between each region may be observed as a "long haul" communication, a "regional" communication, a "metro" communication, and "user" communication regions. As such, N×N arrays 1405, 1506 and 1410 provide communication between the plurality of regions such that optical signals may be communicated to desirable destinations. For example, N×N array 1405 may include optical outputs and optical inputs between region A 1401 and region B 1402. As such, a control circuit may provide a control signal such that an optical signal may be switched using N×N array. For example, N×N array 1405 may diffract or switch a signal in response to heating a junction between two waveguides. As such, an optical signal from region A 1401 may be switched or diffracted by N×N array 1405 to region C 1403.

In another embodiment network 1400 may be operable to communicate or switch optical signals between server 1409 and client terminals 1411, 1412 and 1413. For example, a control circuit (not shown) operably coupled to N×N array 1410 may switch or diffract optical signals between server 1409 client terminals 1411, 1412 and 1413 by providing a signal operable to heat an appropriate junction between two waveguides such that an optical signal incident to N×N array 1410 may be switched or diffract between a client terminal and server 1409. As such, N×N array 1410 may provide efficient communication between server 1409 and client terminals 1411, 1412 and 1413.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. An optical switch for communicating optical signals comprising:

a substrate having at least two waveguides disposed thereon;

each waveguide defined in part by a core disposed in a respective channel of a layer of cladding;

each waveguide formed from material selected to allow optical signals to communicate therethrough;

the waveguides intersecting with each other at a selected angle ($\theta$) to form a junction; and an electrode heater disposed on the layer of cladding adjacent to the junction of the waveguides for use in heating the junction to switch optical signals from one waveguide to the other waveguide by internal reflection.

2. The optical switch of claim 1 further comprising:

a first array of waveguides and a second array of waveguides; and the waveguides of the first array intersecting the waveguides of the second array at the selected angle ($\theta$).

3. The optical switch of claim 1 further comprising the selected angle ($\theta$) having a value between approximately two degrees and six degrees depending on microstructure of the junction and associated index of refraction.

4. The optical switch of claim 1 further comprising the selected angle ($\theta$) having a value of approximately three degrees.

5. The optical switch of claim 1 further comprising the electrode heater formed at least in part from materials selected from the group consisting of nickel chrome alloys, titanium gold (Ti/Au), chromium gold (Cr/Au) and tungsten/gold (W/Au).

6. An optical switching device for communicating optical signals comprising:

a first array of waveguides and a second array of waveguides disposed on a substrate;

the waveguides of the first array extending substantially parallel with each other and the waveguides of the second array extending substantially parallel with each other;

the waveguides of the second array intersecting the waveguides of the first array at a selected angle ($\theta$);

the intersection of the waveguides of the first array and the second array forming a plurality of respective junctions;

a layer of cladding disposed over the waveguides including the respective junctions;

the layer of cladding disposed between adjacent waveguides;

a plurality of electrode heaters respectively disposed on the layer of the cladding adjacent to the junctions of the waveguides; and a source of electrical current coupled with each heater electrode for use in heating the respective junction to switch optical signals from one associated waveguide to the other associated waveguide using internal reflection.

7. The optical switching device of claim 6 further comprising the electrode heaters formed at least in part from material selected from the group consisting of nickel chrome alloys, titanium gold (Ti/Au), chromium gold (Cr/Au) and tungsten/gold (W/Au).

8. The optical switching device of claim 6 further comprising the waveguides formed in part from materials selected from the group consisting of polyimide, silicon dioxide, and a mixture of silicon dioxide and polymeric materials.

9. The optical switching device of claim 6 further comprising the waveguides disposed on a silicon dioxide substrate.

10. The optical switching device of claim 6 further comprising the waveguides formed at least in part from a mixture of silicon dioxide and gallium.

11. The optical switching device of claim 6 further comprising the waveguides formed at least in part from polymers or other combinations of monomers.

12. The optical switching device of claim 6 further comprising the waveguides formed at least in part from tetrafluoroethylne fluorocarbon polymers.

13. The optical switching device of claim 6 further comprising the selected angle (θ) having a value greater than two degrees.

14. The optical switching device of claim 6 further comprising the selected angle (θ) having a value less than six degrees.

15. A method of forming an optical switch to communicate optical signals comprising:

forming a substrate having a first layer of material disposed adjacent to the substrate;

forming at least two waveguides disposed on the first layer with the waveguides intersecting each other at a selected angle (θ);

forming a second layer of material on the first layer to cover the waveguides and provide a layer of cladding for the waveguides; and forming a heater electrode on the layer of cladding adjacent to the intersection of the waveguides.

16. The method of claim 15 further comprising forming the waveguides at least in part from materials selected from the group consisting of polymers and other combinations of monomers.

17. The method of claim 15 further comprising forming the selected angle (θ) with a value between approximately two degrees and six degrees.

18. A method of forming an optical switching device used to direct optical signals from one waveguide to another waveguide comprising;

forming a substrate with a first layer of material disposed adjacent to the substrate;

forming at least two waveguides disposed on the first layer with the waveguides intersecting each other at a selected angle (θ) to form a junction;

forming a second layer of material on the first layer to provide a layer of cladding over the waveguides and the associated junction; and forming the waveguides and the cladding layer at least in part from materials selected from the group consisting of polymers and other combinations of monomers which will produce substantially total internal reflection at the associated junction in response to the thermal optic, electrooptic, magnetooptic or acoustooptic effects.

19. The method of claim 18 further comprising forming the selected angle (θ) with a value less than six degrees.

20. The method of claim 18 further comprising forming the selected angle (θ) with a value greater than two degrees.

21. The method of claim 18 further comprising coupling at least one of the waveguides with an optical signal for communicating digital information.

22. The method of claim 18 further comprising coupling at least one of the waveguides with an optical signal for communicating analog information.

23. The method of claim 18 further comprising forming an electrode heater on the layer of cladding adjacent to the associated junction of the waveguides at a location which maximizes switching efficiency through temperature induced perturbations.

24. The method of claim 18 further comprising forming the associated junction between the waveguides at the selected angle (θ) to provide low insertion loss, low propagation low, low cross-talk with largest available dynamic range.

25. The method of claim 18 further comprising selecting the angle (θ) using beam propagation methods to optimize performance of the optical switching device.

26. A communication system having at least one switching center with a plurality of optical switches operably coupled with each other, each optical switch comprising:

a substrate having a layer of cladding disposed on the substrate with at least two channels formed therein;

each waveguide defined in part by a core respectively disposed in one of the channels formed in the layer of cladding;

each waveguide formed from material selected to allow optical signals to communicate therethrough;

the waveguides intersecting with each other at an angle (θ) to form a junction; and an electrode heater disposed on the layer of cladding adjacent to the junction of the waveguides for use in heating the junction to switch optical signals from at least one waveguide to at least one other waveguide by total internal reflection of the optical signals.

27. The communication system of claim 26 wherein each optical switch comprises a wide band device which is not wavelength dependent.

* * * * *